United States Patent

[11] 3,593,088

[72] Inventors Thomas Pantelakis
Margate;
Dudley D. Nye, Jr., Fort Lauderdale, both of, Fla.

[21] Appl. No. 838,978
[22] Filed July 3, 1969
[45] Patented July 13, 1971
[73] Assignee Borg-Warner Corporation
Chicago, Ill.

[54] MOTOR CONTROL SYSTEM WITH CONTROL AMPLIFIER STAGE HAVING ANTIUNDERSHOOT CIRCUIT
7 Claims, 2 Drawing Figs.

[52] U.S. Cl. .......... 318/345
[51] Int. Cl. .......... H02p 5/16
[50] Field of Search .......... 307/230; 318/331, 345, 341

[56] References Cited

UNITED STATES PATENTS 3,317,806 5/1967 Farinelli .......... 318/398
3,374,362 3/1968 Miller .......... 307/230
3,453,523 7/1969 Fair .......... 318/331

*Primary Examiner*—Oris L. Rader
*Assistant Examiner*—Thomas Langer
*Attorneys*—Donald W. Banner, William S. McCurray and John W. Butcher

ABSTRACT: A DC motor control system is energized by semiconductor switches controlled by firing circuits to regulate the conduction times of the switches. A control amplifier stage provides a signal to regulate the firing circuits and thus regulate motor energization. The control amplifier stage includes an operational amplifier (op amp), and a feedback capacitor. A bias voltage is applied in the output circuit to run the op amp near its saturation point at the minimum speed point, or minimum conduction time of the semiconductor switches. As a speed increase is signalled the op amp conduction level decreases. With this arrangement, with a speed reduction signal to reduce conduction of the semiconductor switches, only negligible excess charge appears across the feedback capacitor to minimize undershoot as the motor comes to the new, lower speed.

Inventors
Thomas Pantelakis
Dudley D. Nye, Jr.
By James J. Jennings, Jr.
Attorney Inventors
Thomas Pantelakis
Dudley D. Nye, Jr.
By James J. Jennings, Jr.
Attorney

MOTOR CONTROL SYSTEM WITH CONTROL AMPLIFIER STAGE HAVING ANTIUNDERSHOOT CIRCUIT

BACKGROUND OF THE INVENTION

In controlling DC motors, various types of control amplifier stages have been utilized to regulate one or more firing circuits which in turn determine the turn-on and turnoff times of semiconductor switches, such as silicon controlled rectifiers (SCR's), which transfer power to the motor. In one circuit arrangement an operational amplifier has been utilized in the control amplifier stage, with various input signals applied to the operational amplifier, and circuit means utilized to control the SCR firing circuits from the output side of the op amp. Such a circuit conventionally utilizes a feedback capacitor coupled between the operational amplifier output circuit and the first, or negative, input connection of the op amp. "Negative" and "positive," as used in reference to the input connections of the op amp, refer to the sense of the feedback signal rather than the polarity of the signals applied to these connections. For example, positive feedback refers to a signal which reinforces the input signal and further increases the output signal.

With such arrangements it has been conventional practice for the op amp circuit to be connected such that an increase in the speed reference signal applied to one of the op amp input connections also provides an increase in the conduction level of the op amp. With such a circuit it has been found that a speed decrease signal applied to an input connection of the op amp leads to significant undershoot of the motor speed because of excess charge stored in the capacitor. Different circuits, such as clipping or limiting circuits, have been employed in an effort to correct this tendency to undershoot but these circuits have not been entirely effective.

It is therefore a primary consideration of this invention to provide a motor energizing system which utilizes an operational amplifier in the control amplifier stage, and which employs an antiundershoot circuit to overcome the deficiencies of the previous arrangements noted above.

SUMMARY OF THE INVENTION

The present invention is particularly useful in an energizing system for an electrical motor in which electrical energy is passed to the motor through a power circuit having at least one semiconductor switch. Motor energization is regulated by a control signal which regulates the conduction time of the semiconductor switch. The system comprises a control amplifier stage, including an operational amplifier having first and second input connections and an output connection. An output conductor is coupled between the op amp output connection and the power circuit, to regulate the on and off times of the semiconductor switch in accordance with the conduction level of the op amp. Means, such as a potentiometer, provides a speed command signal which is applied to one of the op amp input connections. A feedback capacitor is coupled between the output conductor and an input connection of the operational amplifier.

Particularly in accordance with the present invention, means is provided for applying a bias potential to the output conductor to insure that the operational amplifier conducts at a level near its saturation level when the speed command signal calls for a very low speed and thus produces a low on-time of the semiconductor switch. With this arrangement, as an increase speed signal is applied to the op amp its conduction level is reduced toward zero. Accordingly speed reduction signals applied to the op amp will not provide excess charge on the feedback capacitor and produce speed undershoot in the system.

THE DRAWINGS

In the several figures of the drawings, like reference numerals identify like elements, and in the drawings:

FIG. 1 is a block diagram, partly in schematic form, depicting this invention in a motor control system; and FIG. 2 is a schematic diagram illustrating the circuit details of the control amplifier stage and the antiundershoot circuit.

DETAILED DESCRIPTION OF THE INVENTION

Figure 1:
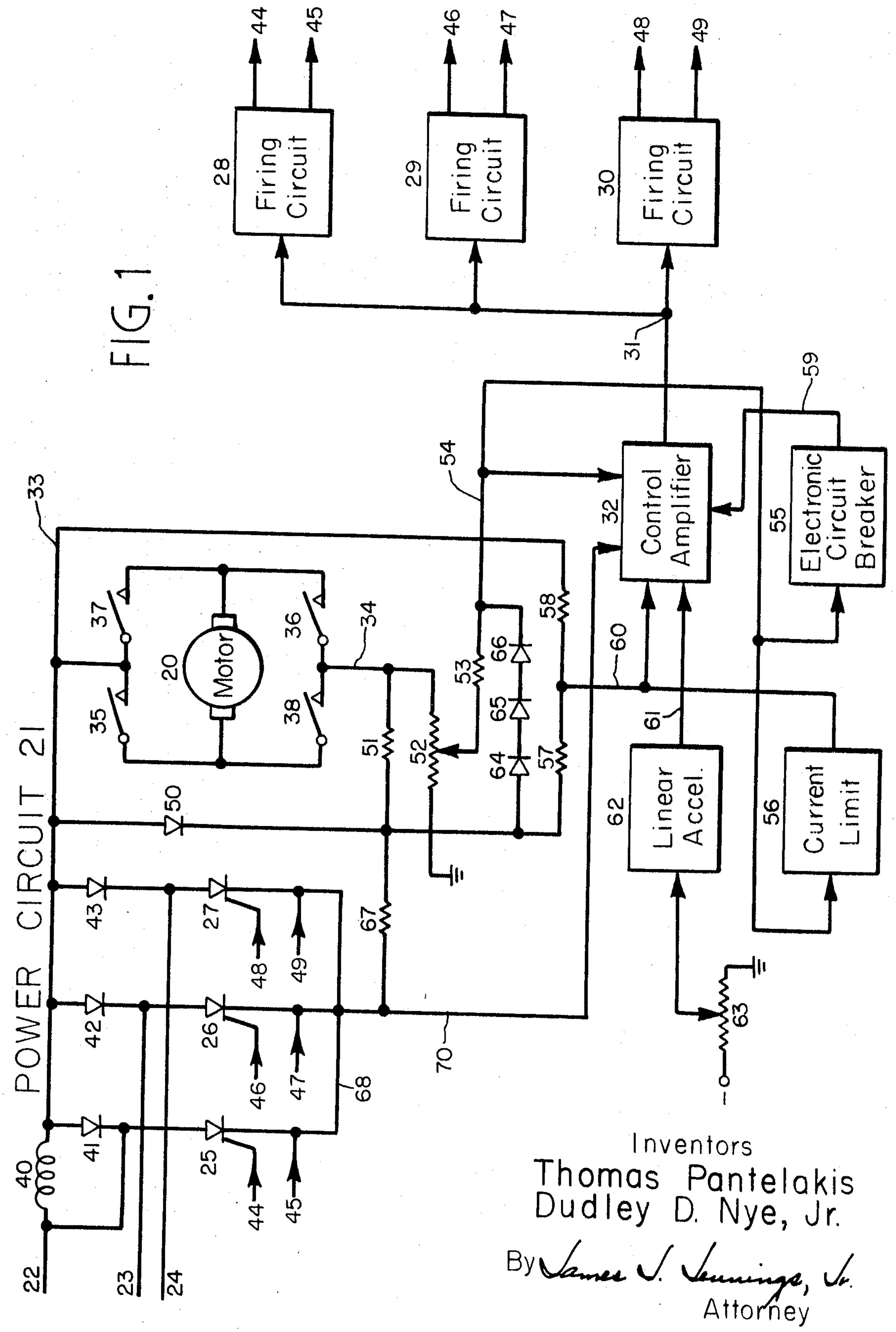

FIG. 1 depicts a motor-energizing system in which the armature circuit of a motor 20 receives energy from a power circuit 21 which, in turn, is supplied with three-phase AC energy over three input conductors 22, 23 and 24. The level of energy passed to the motor is determined by the conduction times of semiconductor switches or silicon controlled rectifiers (SCR's) 25, 26 and 27 which, in turn, are regulated by gating signals provided by firing circuits 28, 29 and 30. The firing circuits are regulated by an output signal received over circuit 31 from a control amplifier 32, which operates in response to different input signals.

Motor 20 is energized as DC energy is passed through power circuit 21 and applied between conductors 33 and 34. When switches 35 and 36 are closed, current flows through motor 20 in a first direction and effects motor rotation in a given angular direction. When switches 35, 36 are opened and switches 37, 38 are closed (by control components not illustrated because they are well known), current flows through motor 20 in the opposite direction and effects motor rotation in the opposite angular direction.

Motor field winding 40 is coupled between conductors 22 and 33. Three diodes 41, 42 and 43 are respectively coupled in series with the semiconductor switches 25, 26 and 27. The input conductors 22—24 are respectively connected to the common connections between each diode-SCR pair. Although the semiconductor switches 25—27 are illustrated as silicon controlled rectifiers, other components such as thyratrons, ignitrons, power transistors, transistors, electron-discharge devices and similar switching units can be used in their place. In another method, only one semiconductor switch is required to regulate the level of motor energization. Such switch can be coupled in a series circuit connection, in a "chopper" or DC-to-DC converter arrangement, in lieu of the illustrated three-phase rectifier arrangement. Silicon controlled rectifier 25 receives gating signals over conductors 44, 45 from firing circuit 28; SCR 26 receives gating signals over conductors 46 and 47 from firing circuit 29; and SCR 27 receives firing signals over conductors 48, 49 from firing circuit 30. Thus the conduction level, or on time, of the SCR's 25—27 determines the level of the voltage applied between conductors 33, 34 to energize motor 20 as the appropriate switch pair 35, 36 or 37, 38 is closed.

A "freewheeling" diode 50 is coupled between conductor 33 and circuit common, or ground. Because of the inductive reactance of the motor, the turnoff of a given silicon controlled rectifier may terminate current supply while the motor tends to keep current flowing; the freewheeling diode 50 maintains a path for the continuing current flow. A resistor 51 is coupled between conductor 34 and ground. A potentiometer 52 is coupled between conductor 34 and ground, and the movable arm is coupled over a resistor 53 to a common conductor 54 which, in turn, is coupled to control amplifier 32, an electronic circuit breaker 55, and a current limit stage 56. The stages 55 and 56 are illustrated to give an overall perspective of the motor-energizing system, but are not necessary to an understanding of the present invention. The circuit including conductor 54, resistor 53, a portion of potentiometer 52, and resistor 51 applies a signal related to the current flow through the motor armature to the control amplifier stage 32.

A pair of resistors 57, 58 are coupled in series between conductor 33 and ground, and conductor 60 is coupled between the midpoint of these two resistors and an input circuit of control amplifier stage 32. Conductor 60 is also coupled to current limit stage 56. The circuit including conductor 60, and resistors 57 and 58, applies a signal related to the terminal voltage of motor 20 to the input circuit of control amplifier stage 32. The control amplifier stage also receives a speed reference signal over line 61 from a linear acceleration stage 62, which in turn receives an input signal from the movable arm of a potentiometer 63. Linear acceleration stage 62 is utilized to translate a step function change of the setting of potentiometer 63 into a gradual, smooth transition of a speed control signal applied over line 61 to the control amplifier stage 32.

Three diodes 64, 65 and 66 are coupled in series between conductor 54 and ground to protect against an unduly large signal being passed over conductor 54 to the amplifier stage if resistor 51 were to open, or if for some other reason an excess of current were to be suddenly supplied over resistor 53. A resistor 67 is coupled between ground and a common conductor 68 coupled to the cathodes of all the semiconductor switches 25, 26 and 27. Conductor 70 is coupled to the common connection of resistor 67 and common conductor 68, and is also coupled to control amplifier stage 32.

Figure 2:
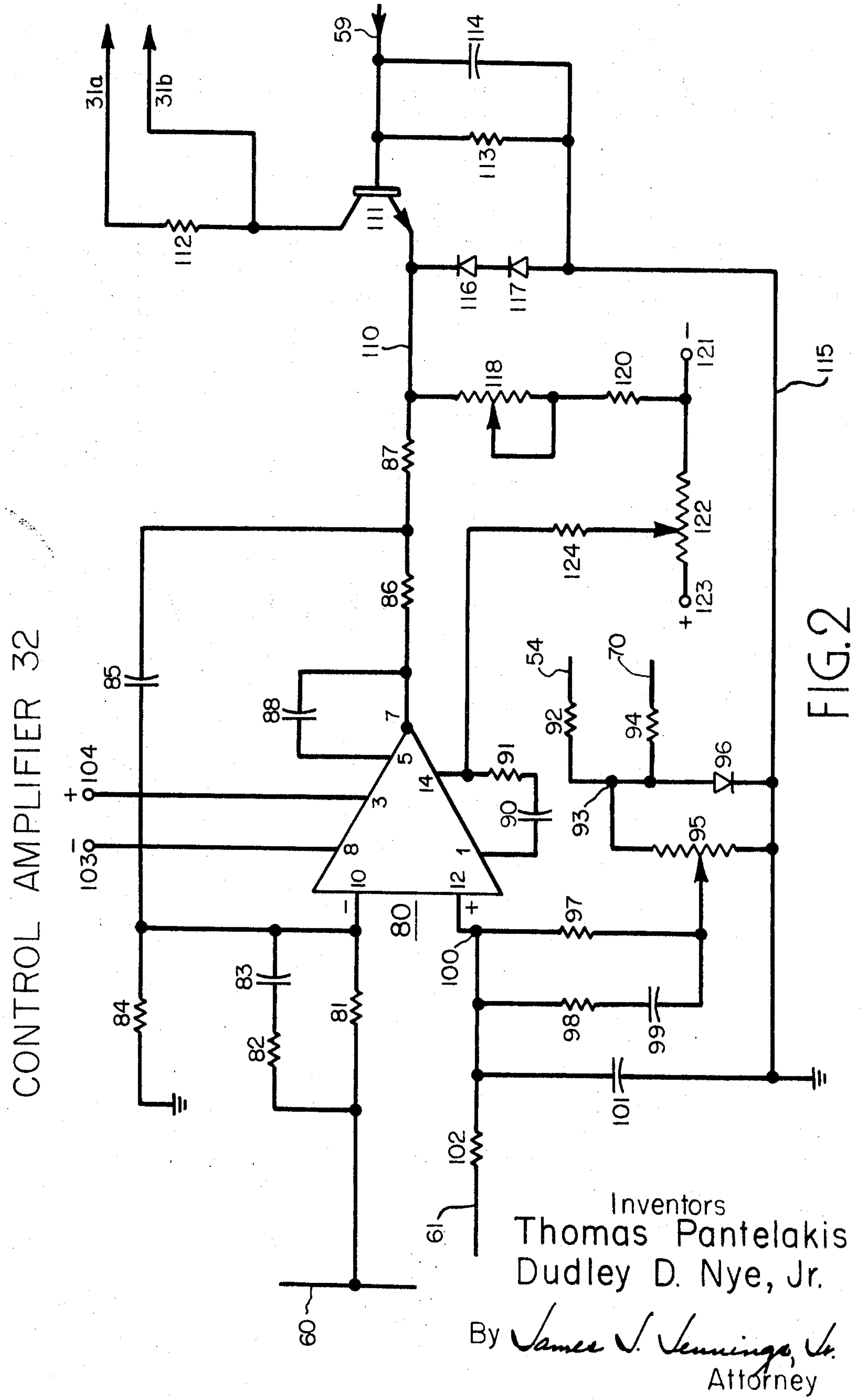

Considering now the control amplifier stage 32, schematic details of this unit are depicted in FIG. 2. As shown, a salient component of the control amplifier stage is an operational amplifier (op amp) 80. Various terminals are numbered within the schematic representation of FIG. 2, except for output terminal 7 which is referenced externally, to facilitate practice of the invention by those skilled in the art.

Conductor 60, on which the signal related to the motor terminal voltage is provided, is coupled over a resistor 81 to the first input connection 10 of op amp 80. A series circuit comprising resistor 82 and capacitor 83 is coupled in parallel with the resistor 81. Another resistor 84 is coupled between first input connection 10 and ground. A feedback capacitor 85 is coupled between first input connection 10 and the common connection between a pair of series-connected output resistors 86, 87, shown coupled between output connection 7 of the op amp and output conductor 110. Capacitor 85 is the feedback capacitor across which it is desired to minimize accumulation of excess charge when a speed reduction signal is applied to input connection 12 of the op amp, to avoid undershoot as the motor coasts to the new, lower speed. Op amp stabilizing components include a capacitor 88 coupled between output connection 7 and connection 5, and a series circuit comprising another capacitor 90 and a resistor 91 coupled between connections 1 and 14.

IR compensation signals are applied over conductors 54 and 70, and resistors 92 and 94, to common connection 93. A potentiometer 95 is coupled between terminal 93 and ground, and a diode 96 is coupled between common connection 93 and ground. A series circuit including a resistor 98 and a capacitor 99 is coupled in parallel with resistor 97, between common connection 100 and the movable arm of potentiometer 95. A capacitor 101 is coupled between common connection 100 and ground, and a resistor 102 is coupled between conductor 61 and common connection 100. Potentiometer 63 (FIG. 1) represents a means for providing a speed reference signal, which is applied over linear acceleration stage 62 to conductor 61. Resistors 102 and 97 effectively combine the resultant sum signal at connection 93 with the speed reference signal over conductor 61, and produce a composite summation signal at common connection 100 for application to the second input connection of the operational amplifier. For purposes of explaining this invention, only the speed reference signal need be considered.

The control signal present on output conductor 110 is related to the level of conduction of op amp 80. This control signal is applied to the emitter of a variable semiconductor switch, shown as an NPN type transistor 111. The collector of this transistor is coupled to one end of a resistor 112, which resistor is coupled between conductors 31*a*, 31*b* for applying an output signal to all the firing circuits 28—30. This output signal which actually regulates the turn-on times of the SCR's 25—27 can be considered essentially the same as the control signal on output conductor 110, except when an override signal is received over conductor 59 from electronic circuit breaker 55 as a motor overload condition is sensed. The override signal dictates that the output signal not gate on any of the SCR's. A resistor 113 is coupled in parallel with a capacitor 114 between conductor 59 and common or ground conductor 115. A pair of diodes 116, 117 is coupled in series between the emitter of transistor 111 and conductor 115.

Particularly in accordance with the present invention, means is provided for applying a first bias potential to the output conductor 110, to insure that op amp 80 conducts at a level which is substantially its saturation level when the speed indicating reference signal received over conductor 61 calls for a very low speed, or very low ontime of the SCR's 25—27. With this bias arrangement an increase speed reference signal applied over conductor 61 and resistor 102 to second input connection 12 of the op amp gradually reduces the conduction level of op amp 80 towards zero. In the embodiment shown this was accomplished by coupling a potentiometer 118 and a resistor 120 in series between output conductor 110 and terminal 121, to which a negative energizing potential was applied when the circuit was energized. The effective value of potentiometer 118 was then adjusted to insure op amp 80 was conducting at very nearly its saturation value with a minimum speed signal, or a condition where SCR's 25—27 are conducting with a very low conduction angle or ontime. With this arrangement application of a speed reduction reference signal over resistor 102 to terminal 12 of the op amp did not provide excess charge on feedback capacitor 80, thus avoiding speed undershoot as the system coasted down to the new, lower motor speed.

The dynamics of the control amplifier stage 32 must be compatible with the motor being controlled to prevent self-oscillation of the complete system. The control amplifier dynamics are determined and set by the RC networks 81—85 and 97—99.

It is also desirable with a circuit employing an operational amplifier that a zero output voltage be provided by the op amp when a zero input signal is received at both input connections. In practice this is not realized and there is generally a small initial offset of the zero point. That is, it requires a small initial offset in the signals applied between input terminals 10 and 12 of the op amp to produce a zero output signal in the output circuit. To avoid this initial offset, in the circuit of this invention another potentiometer 122 was coupled between terminals 123 and 121, and a resistor 124 was coupled between the movable contact of potentiometer 122 and terminal 14 of the op amp. A positive energizing potential was applied to terminal 123, and the position of the movable contact of potentiometer 122 was adjusted to provide a zero signal in the output circuit of the op amp when a zero signal was present at both input connections. Thus potentiometer 122 represents means for applying a second bias potential to connection 14 of the op amp to attain the desired zero output signal without any initial offset of the signals at the input terminals. In practice potentiometer 122 is set to just provide zero speed when potentiometer 63 is at zero.

By way of illustration only and in no sense by way of limitation, a table of values for the components of FIG. 2 is set out below to assist those skilled in the art to practice the invention with a minimum of experimentation. With the illustrated circuit, op amp 80 was a GE type PA-238. A negative 6 volt potential relative to ground was applied to terminals 103 and 121, and a positive 6 volt potential was applied to terminals 104 and 123.

Components and values:

111—2N3417
96, 116, 117—1N5059
83, 99—10 mfd. ±20%, 6 v. DC
85—1.0 mfd. ±20%, 250 v. DC
88—47 pfd. ±10%, 500 v. DC
90—1,000 pfd. ±20%, 100 v. DC
101, 114—.047 mfd. ±10%, 250 v. DC
81, 84, 97, 102—15K ohms ±1%
82—6.8K ohms ±5%
86—402 ohms ±1%
87—1K ohms ±10%
91—390 ohms ±10%
92—47 ohms ±5%

94—180 ohms ± 5%
95—500 ohms ± 20%
98—10K ohms ± 5%
112—383 ohms ± 1%
113—4.7K ohms ± 10%
118—500 ohms ± 20%
120—649 ohms ± 1%
122—10K ohms ± 20%
124—22K ohms ± 10%

Although only a particular embodiment of the invention has been described and illustrated, it is apparent that various modifications and alterations may be made therein. It is therefore the intention in the appended claims to cover all such modifications and alterations as may fall within the true spirit and scope of the invention.

What we claim is:

1. An energizing system for an electrical motor in which electrical energy is passed to the motor through a power circuit having at least one semiconductor switch, the motor energization being regulated by a control signal which regulates the conduction time of the semiconductor switch, which system comprises:

a control amplifier stage including an operational amplifier having first and second input connections and an output connection;

an output conductor coupled between the operational amplifier output connection and the power circuit to regulate the on and off times of the semiconductor switch in accordance with the conduction level of the operational amplifier, means for providing a speed command signal and for applying the speed command signal to one of the operational amplifier input connections, a feedback capacitor coupled between the output conductor and an input connection of the operational amplifier, and means for applying to said output conductor a first bias potential of a level to effect near saturation conduction of the operational amplifier when the speed command signal calls for a very low speed and thus produces a low ontime of the semiconductor switch, and to insure that an increasing speed signal applied to the operational amplifier reduces the conduction level of the operational amplifier toward zero, such that speed reduction signals applied to the operational amplifier will not provide excess charge on the feedback capacitor and produce speed undershoot in the system.

2. A motor-energizing system as claimed in claim 1 in which said operational amplifier includes an additional connection, and means for applying a second bias potential to said additional connection, to insure that a zero output voltage is provided in the output circuit of the operational amplifier when a zero input signal is applied to both the first and second input connections.

3. A motor-energizing system as claimed in claim 1 and further comprising a firing circuit coupled to the semiconductor switch to regulate its turn-on time, and a variable semiconductor switch, coupled between the firing circuit and the output conductor which is coupled to the operational amplifier, which variable semiconductor switch is normally conducting to transfer the control signal to the firing circuit, and means for providing an override signal to said variable semiconductor switch for turning the variable semiconductor switch off and interrupting power transfer to the motor upon sensing a motor overload condition.

4. An energizing system for a DC motor in which three-phase electrical energy is rectifier in a power circuit including three SCR's to energize the motor, and in which three firing circuits are connected to regulate the turn-on times of the respective SCR's in accordance with a received control signal, comprising:

a control amplifier stage, including an operational amplifier having first and second input connections and an output connection, and an output conductor coupled between the output connection and the firing circuits to regulate the turn-on times of the SCR's in accordance with the conduction level of the operational amplifier, means for providing a signal related to the motor terminal voltage to the first input connection of the operational amplifier, means for providing a speed reference signal to the second input connection of the operational amplifier, a feedback capacitor coupled between the output connection and the first input connection of the operational amplifier, and means for applying to said output conductor a first bias voltage of a level to effect near saturation conduction of the operational amplifier when the speed reference signal applied to the second input connection signals a very low speed and thus produces a low ontime of the SCR's, and when an increase-speed reference signal is applied to the second input connection provides a reduction in the conduction level of the operational amplifier toward zero, such that a reduce speed reference signal applied to the second input connection of the operational amplifier will not produce excess charge on the feedback capacitor with consequent speed undershoot as the motor coasts to the new, lower speed.

5. A motor-energizing system as claimed in claim 4, in which the means for applying the first bias voltage to the output conductor includes a potentiometer.

6. A motor-energizing system as claimed in claim 4 in which the operational amplifier includes an additional connection, and means is provided for applying a second bias voltage to this additional connection, to insure that a zero output voltage is provided in the output circuit of the operational amplifier when a zero input signal is applied to both the first and second input connections.

7. A motor energizing system as claimed in claim 6 in which the means for applying the second bias voltage includes a potentiometer to facilitate adjustment of the operational amplifier circuit.